(12) United States Patent
Yanagi

(10) Patent No.: US 10,322,748 B2
(45) Date of Patent: Jun. 18, 2019

(54) MOTOR CONTROLLER AND STEERING DEVICE

(71) Applicants: JTEKT CORPORATION, Osaka-shi, Osaka (JP); JAPAN AUTOMOBILE RESEARCH INSTITUTE, Tokyo (JP)

(72) Inventor: Takuya Yanagi, Toyota (JP)

(73) Assignees: JTEKT CORPORATION, Osaka-shi (JP); JAPAN AUTOMOBILE RESEARCH INSTITUTE, Tokyo (JP)

( * ) Notice: Subject to any disclaimer, the term of this patent is extended or adjusted under 35 U.S.C. 154(b) by 125 days.

(21) Appl. No.: 15/698,274

(22) Filed: Sep. 7, 2017

(65) Prior Publication Data

US 2018/0086369 A1 Mar. 29, 2018

(30) Foreign Application Priority Data

Sep. 23, 2016 (JP) .................................. 2016-186119
Sep. 23, 2016 (JP) .................................. 2016-186120

(51) Int. Cl.
*B62D 5/04* (2006.01)
*B62D 5/00* (2006.01)
*H02P 6/04* (2016.01)

(52) U.S. Cl.
CPC ........... *B62D 5/0493* (2013.01); *B62D 5/003* (2013.01); *B62D 5/049* (2013.01); *B62D 5/0463* (2013.01); *B62D 5/0481* (2013.01); *B62D 5/0484* (2013.01); *H02P 6/04* (2013.01)

(58) Field of Classification Search
CPC .... B62D 5/0493; B62D 5/003; B62D 5/0463; B62D 5/0481; B62D 5/0484; B62D 5/049; H02P 6/04
See application file for complete search history.

(56) References Cited

U.S. PATENT DOCUMENTS

| | | | |
|---|---|---|---|
| 5,428,541 A * | 6/1995 | Miyata et al. ......... | B60K 28/16 364/426.02 |
| 6,256,561 B1 * | 7/2001 | Asanuma ............... | B62D 1/286 180/197 |
| 7,610,134 B2 * | 10/2009 | Maeda et al. ............ | B62D 6/00 701/41 |

(Continued)

FOREIGN PATENT DOCUMENTS

JP 2004-182039 A 7/2004

*Primary Examiner* — Kevin Hurley
*Assistant Examiner* — Gabriela C Craciun
(74) *Attorney, Agent, or Firm* — Oliff PLC

(57) ABSTRACT

A motor controller includes control systems that control actuation of a motor. Each control system includes a drive circuit and a calculation unit. The calculation unit of each control system is connected to an independent rotation angle sensor. The calculation units include master and slave calculation units. The master and slave calculation units control actuation of the corresponding drive circuit based on a current instruction value calculated by the master calculation unit and a detection result of the rotation angle sensor connected to the master calculation unit. When the detection result of the rotation angle sensor connected to the master calculation unit is abnormal, the master and slave calculation units each use a detection result of the rotation angle sensor connected to the slave calculation unit to control the actuation of the corresponding drive circuit.

10 Claims, 5 Drawing Sheets

(56) References Cited

U.S. PATENT DOCUMENTS

| | | | | | |
|---|---|---|---|---|---|
| 7,809,483 | B2* | 10/2010 | Nishikawa | | A01B 69/00 701/41 |
| 8,346,476 | B2* | 1/2013 | Taguchi | | B60W 30/143 701/424 |
| 9,463,827 | B2* | 10/2016 | Mose | | B62D 5/0463 |
| 9,793,849 | B2* | 10/2017 | Kawano | | H02P 6/16 |
| 10,056,854 | B2* | 8/2018 | Mori | | H02P 6/17 |
| 10,124,825 | B2* | 11/2018 | Wada | | B62D 5/0463 |
| 10,205,416 | B2* | 2/2019 | Furukawa | | H02P 29/00 |
| 2002/0038171 | A1* | 3/2002 | Deguchi | | B62D 7/159 701/41 |
| 2002/0177932 | A1* | 11/2002 | Kifuku | | B62D 5/0463 701/41 |
| 2003/0106737 | A1* | 6/2003 | Itakura | | B62D 5/0484 180/446 |
| 2004/0204808 | A1* | 10/2004 | Satoh | | B62D 6/005 701/41 |
| 2008/0078608 | A1* | 4/2008 | Hara | | B62D 5/0484 180/446 |
| 2009/0021207 | A1* | 1/2009 | Kezobo | | B62D 5/0484 318/798 |
| 2012/0074885 | A1* | 3/2012 | Hirono | | H02M 1/32 318/400.22 |
| 2014/0009093 | A1* | 1/2014 | Suzuki | | H02P 25/22 318/400.02 |
| 2014/0055059 | A1* | 2/2014 | Uryu | | H02P 27/06 318/9 |
| 2014/0217940 | A1* | 8/2014 | Kawamura | | B62D 5/0484 318/400.26 |
| 2014/0312809 | A1* | 10/2014 | Ishida | | H02P 25/22 318/139 |
| 2015/0025743 | A1* | 1/2015 | Tamura | | B62D 5/046 701/41 |
| 2015/0120134 | A1* | 4/2015 | Kanou | | B62D 15/0245 701/34.4 |
| 2016/0001810 | A1* | 1/2016 | Tsubaki | | B62D 5/0472 701/42 |
| 2016/0028336 | A1* | 1/2016 | Oyama | | H02P 27/06 318/564 |
| 2016/0137221 | A1* | 5/2016 | Mose | | B62D 5/0463 701/41 |
| 2016/0229447 | A1* | 8/2016 | Wada | | B62D 6/007 |
| 2017/0166248 | A1* | 6/2017 | Asao | | B62D 5/0484 |
| 2017/0237377 | A1* | 8/2017 | Furukawa | | H02P 29/00 318/564 |

\* cited by examiner

MOTOR CONTROLLER AND STEERING DEVICE

BACKGROUND

The present invention relates to a motor controller and a steering device.

Japanese Laid-Open Patent Publication No. 2004-182039 describes an example of a vehicle steering device for vehicles. The vehicles steering device includes motors for a plurality of systems and a steering controller serving as a motor controller that controls actuation of the motors.

In detail, the steering controller controls the actuation two systems of motors, which include a first motor having a first motor winding and a second motor having a second motor winding, to apply power to a steering mechanism. The steering controller includes a first system and a second system. The first system includes a first ECU combined with a first drive circuit to supply current to the first motor, and the second system includes a second ECU combined with a second drive circuit to supply current to the second motor. Further, an external device inputs a steering angle of a steering wheel as a position signal to each of the first and the second ECUs. Independent rotation angle sensors that detect rotation angles of the first and the second motors are connected to the first and the second ECUs, respectively.

Specifically, the first ECU generates a torque instruction value by using the position signal input to the first ECU. The torque instruction value is distributed to the first ECU and the second ECU by the first ECU. Each of the first and the second ECUs controls actuation of the corresponding drive circuit based on the torque instruction value distributed to itself and a detection result of the corresponding rotation angle sensor. That is, the first ECU functions as a master, and the second ECU functions as a slave.

The second ECU is formed to interrupt the supply of current from the first system to the first motor winding when the first ECU is abnormal such as when an abnormality is included in the position signal input to the first ECU serving as the master from the external device or the detection result of the rotation angle sensor connected to the first ECU. In this case, the second ECU serving as the slave generates the torque instruction value by using the position signal input from the external device and controls the actuation of the corresponding drive circuit by using the detection result of the rotation angle sensor connected to the second ECU. That is, when the first ECU is abnormal, at least the supply of current from the second ECU to the second motor winding is maintained to ensure output of the second motor.

As described in Japanese Patent Publication No. 2004-182039, when the first ECU serving as the master is abnormal, the supply of current from the first ECU to the first motor winding is interrupted. Thus, the output of the first motor is lost. That is, the total motor output when the first ECU is abnormal is equal to one-half of total motor output when the first ECU is normal. Thus, it is desirable that the decrease in the total motor output be minimized when the first ECU serving as the master is abnormal. Such a desire is not limited to a device that supplies power to a vehicle steering mechanism and also arises when a device control actuation of a motor.

SUMMARY OF THE INVENTION

It is an object of the present invention to provide a motor controller and a steering device capable of minimizing decreases in the total motor output when a master is abnormal.

A motor controller that achieves the above object includes a plurality of control systems configured to control actuation of a motor including windings of a plurality of systems. The control systems each include a drive circuit configured to supply current to a corresponding winding and a calculation unit combined with the drive circuit. The calculation unit of each of the control systems is connected to an independent rotation angle sensor that detects a rotation angle of the motor. The calculation units include a master calculation unit and a slave calculation unit. The master calculation unit is configured to calculate a current instruction value as a target of a current amount supplied to each of the windings and output a detection result of the rotation angle sensor connected to the master calculation unit, together with the current instruction value, to the slave calculation unit. The master calculation unit and the slave calculation unit are each configured to control actuation of the corresponding drive circuit based on the current instruction value and the detection result of the rotation angle sensor connected to the master calculation unit. When an abnormality is included in the detection result of the rotation angle sensor connected to the master calculation unit, the master calculation unit and the slave calculation unit are each configured to use a detection result of the rotation angle sensor connected to the slave calculation unit instead of the detection result of the rotation angle sensor connected to the master calculation unit to control the actuation of the corresponding drive circuit.

A further motor controller that achieves the above object includes a plurality of control systems configured to control actuation of a motor including windings of a plurality of systems. The control systems each include a drive circuit configured to supply current to a corresponding winding and a calculation unit combined with the drive circuit. An independent external instruction value from an external device is input to the calculation unit of each of the control system. The calculation units include a master calculation unit and a slave calculation unit. The master calculation unit is configured to use the external instruction value and calculate a current instruction value as a target of a current amount supplied to each of the windings and to output the current instruction value to the slave calculation unit. Each of the master calculation unit and the slave calculation unit is configured to control actuation of the corresponding drive circuit based on the current instruction value. When an abnormality is included in the external instruction value input to the master calculation unit from the external device, the slave calculation unit is configured to use the external instruction value input to the slave calculation unit from the external device instead of the external instruction value input to the master calculation unit to calculate the current instruction value.

Other aspects and advantages of the present invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of a motor controller and a steering device will now be described.

Figure 1:
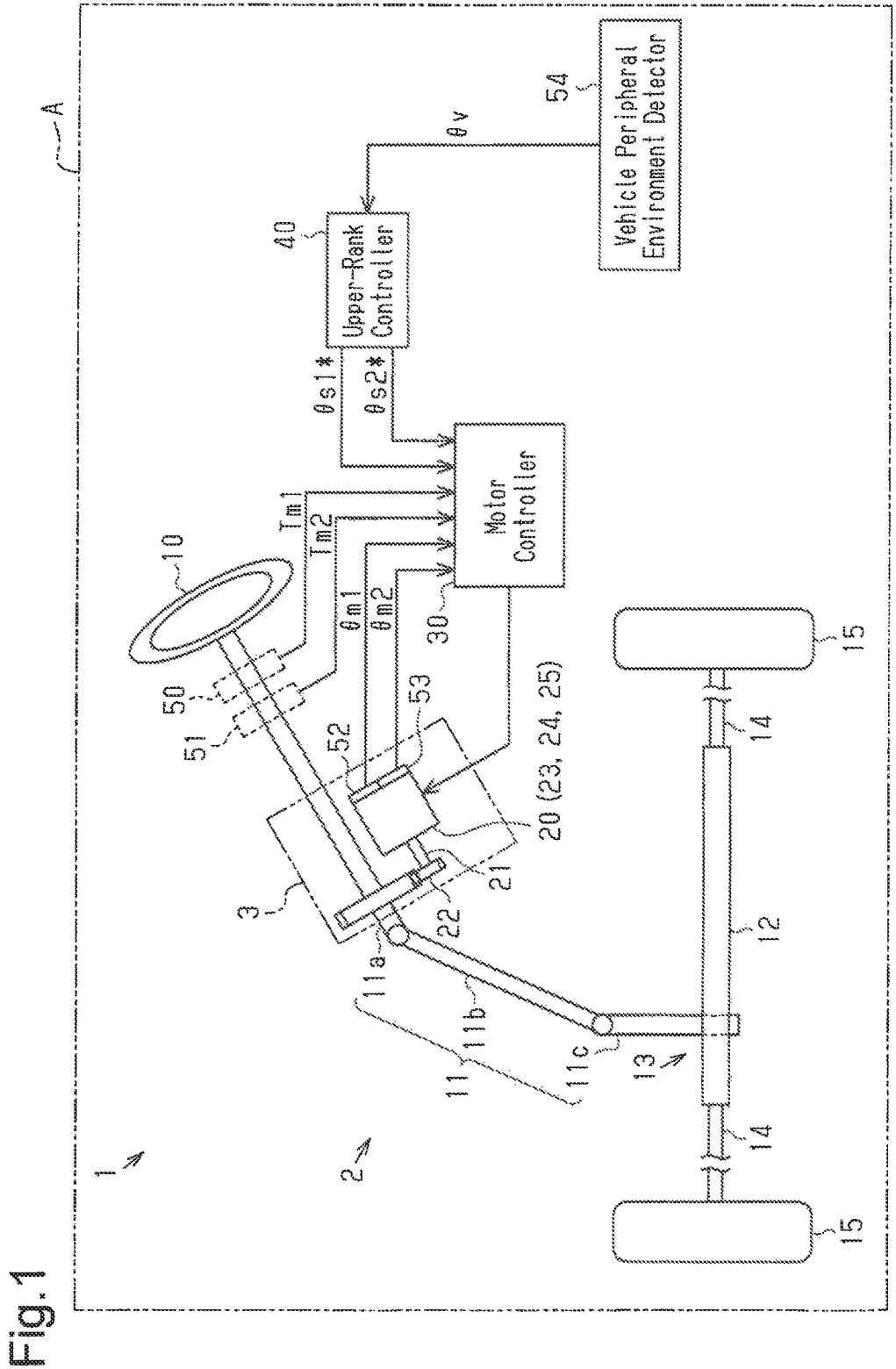
FIG. 1 is a schematic diagram showing the configuration of an electric power steering device according to one embodiment.

As shown in FIG. 1, a vehicle steering system 1, which forms a lane deviation prevention assist system, for example, which suppresses lane deviation of a vehicle A in travelling of the vehicle A by applying power to a steering mechanism 2 described below in order to automatically change a travel direction of the vehicle A, is mounted on the vehicle A. The vehicle steering system 1 is one example of a steering device.

The steering mechanism 2 includes a steering wheel 10 operated by a user, and a steering shaft 11 fixed to the steering wheel 10. The steering shaft 11 includes a column shaft 11a joined to the steering wheel 10, an intermediate shaft 11b joined to a lower end of the column shaft 11a, and a pinion shaft 11c joined to a lower end of the intermediate shaft 11b. A lower end of the pinion shaft 11c is joined to a rack shaft 12 by a rack and pinion mechanism 13. A rotary motion of the steering shaft 11 is converted into a reciprocal linear motion in an axial direction of the rack shaft 12 by the rack and pinion mechanism 13. The reciprocal linear motion is transmitted to left and right steered wheels 15 by tie rods 14 joined to both ends of the rack shaft 12 respectively, and thereby steering angles of the steered wheels 15 are changed.

An actuator 3 including a motor 20 as a power generation source which applies the power to the steering mechanism 2 is arranged in the middle of the column shaft 11a fixed to the steering wheel 10. For example, the motor 20 is formed as a surface permanent magnet synchronous motor (SPMSM) and formed as a three-phase brushless motor rotated based on drive power of three-phase (U-phase, V-phase, and W-phase). A rotation shaft 21 of the motor 20 is joined to the column shaft 11a by a speed reduction mechanism 22. The actuator 3 transmits rotation force of the rotation shaft 21 of the motor 20 to the column shaft 11a by the speed reduction mechanism 22. Torque (rotation force) of the motor 20 applied to the column shaft 11a is transmitted as the power (steering force) to the left and right steered wheels 15, and thereby the steering angles of the steered wheels 15 are changed.

Figure 2:
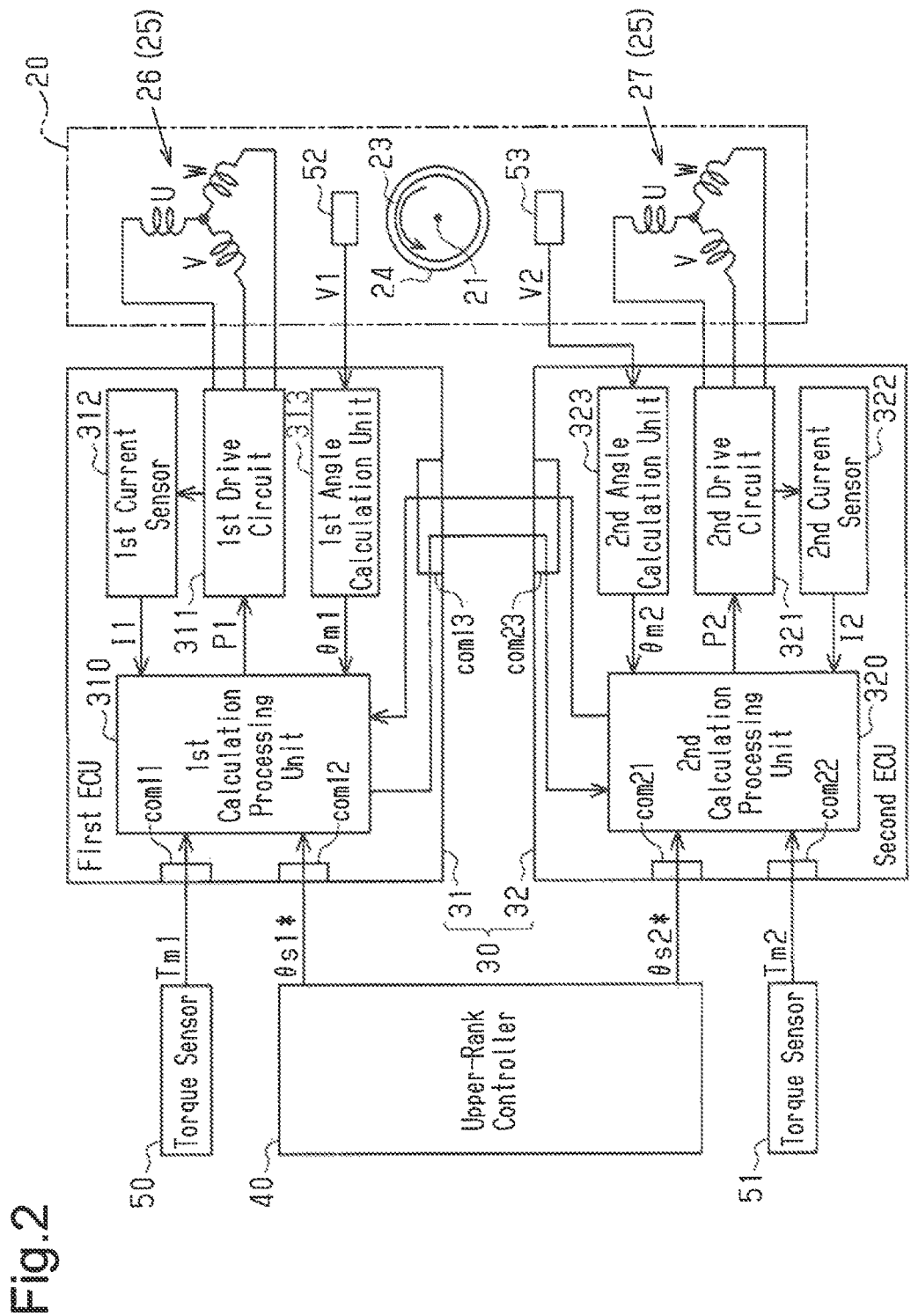
FIG. 2 is a block diagram illustrating the electric configuration of the electric power steering device shown in FIG. 1.

As shown in FIG. 2, the motor 20 includes a rotor 23 rotated around the rotation shaft 21, and a stator 24 arranged around the rotor 23. A permanent magnet is fixed on a surface of the rotor 23. An N-pole permanent magnet and an S-pole permanent magnet are alternately arranged in a circumferential direction of the rotor 23. The permanent magnet forms a magnetic system which generates a magnetic field when the motor 20 is rotated. A first system winding 26 and a second system winding 27 are arranged in the stator 24. Each of the first system winding 26 and the second system winding 27 includes a plurality of windings 25 of the three-phase (U-phase, V-phase, and W-phase). Each of the first system winding 26 and the second system winding 27 is connected in a star connection manner. Further, the windings 25 belonging to the first system winding 26 and the windings 25 belonging to the second system winding 27 may be arranged in a circumferential direction of the stator 24 in an alternate manner or in a non-alternate manner. Alternatively, one winding 25 belonging to the first system winding 26 and one winding 25 belonging to the second system winding 27 may be arranged to be laminated in a radial direction of the stator 24 with respect to the same tooth.

Returned to FIG. 1, a motor controller 30 which controls actuation (driving) of the motor 20 by controlling a current amount as a control amount of the motor 20 is connected to the actuator 3. The motor controller 30 controls the operation of the motor 20 based on detection results of various sensors arranged in the vehicle A. As the various sensors, for example, two torque sensors 50, 51 and two rotation angle sensors 52, 53 are arranged.

The torque sensors 50, 51 are arranged in the column shaft 11a, and the rotation angle sensors 52, 53 are arranged in the motor 20. The torque sensors 50, 51 respectively detect torque values Tm1, Tm2 which indicate a magnitude and a direction of steering torque as a load applied to the steering shaft 11 by steering operation of a user. The rotation angle sensors 52, 53 respectively detect rotation angles θm1, θm2 of the rotation shaft 21 of the motor 20. Further, there is a correlation between the rotation angles θm1, θm2 and a rotation angle of the column shaft 11a interlocked with the steering operation of a user. Similarly, there is a correlation between the rotation angles θm1, θm2 and a steering angle of the steered wheel 15 interlocked with the steering operation of a user. The rotation angle of the column shaft 11a, namely an actual angle of the column shaft 11a, can be calculated by multiplying a conversion coefficient by the rotation angles θm1, θm2 that undergo processing. Further, the steering angle of the steered wheel 15 may be calculated as the actual angle based on the rotation angles θm1, θm2.

Further, the torque sensors 50, 51 have the same structure and are formed by, for example, a hall IC (element) which outputs a digital value in accordance with the steering torque. The detection subjects of the torque sensors 50, 51 are set to the same column shaft 11a, and therefore substantially the same digital values are output by the torque sensors 50, 51 when both of the torque sensors 50, 51 are normal. Thus, a system according to the detection of the steering torque is made to be redundant. That is, information of the steering torque as the detection result of the system is made to be redundant. Similarly, the rotation angle sensors 52, 53 have the same configuration to each other formed of, for example, a hall IC (element) which outputs a digital value in accordance with the rotation angle of the rotation shaft 21 of the motor 20. The detection subjects of the rotation angle sensors 52, 53 are set to the same rotation shaft 21, and therefore substantially the same digital values are output by the rotation angle sensors 52, 53 when both of the rotation angle sensors 52, 53 are normal. Thus, a system according to the detection of the rotation angle is made to be redundant. That is, information of the rotation angle as the detection result of the system is made to be redundant.

Further, an upper-rank controller 40 mounted in the vehicle A is connected to the motor controller 30. The upper-rank controller 40 instructs the motor controller 30 to execute automatic steering control (lane keeping control) in which a travel direction of the vehicle A is automatically changed.

The upper-rank controller 40 calculates two angle instruction values $\theta s1^*$, $\theta s2^*$ used for the automatic steering control in predetermined cycles based on a detection result of a vehicle peripheral environment detector 54. For example, the vehicle peripheral environment detector 54 includes at least one of a GPS such as a car navigation system mounted in the vehicle A, other on-vehicle sensors (a camera, a distance sensor, a yaw rate sensor, a laser and the like), and an on-vehicle device which executes vehicle-road communication. Further, the upper-rank controller 40 outputs the calculated angle instruction values $\theta s1^*$, $\theta s2^*$ to the motor controller 30 independently in predetermined cycles. In the present embodiment, the calculated angle instruction values $\theta s1^*$, $\theta s2^*$ are one example of an external instruction value.

The vehicle peripheral environment detector 54 calculates angle information $\theta v$ based on a detected vehicle peripheral environment. The angle information $\theta v$ is, for example, a relative direction of the vehicle A against a road. The angle information $\theta v$ corresponds to a component (state quantity) of the travel direction of the vehicle A which indicates the steering angle of the steered wheel 15 against a straight travel direction of the vehicle A. Thus, the rotation angles $\theta m1$, $\theta m2$ which can be converted into the steering angle of the steered wheel 15, are components which indicate the actual travel direction of the vehicle A. Further, the angle instruction values $\theta s1^*$, $\theta s2^*$ used in the automatic steering control are target values of components which indicate the travel direction of the vehicle A. The angle instruction values $\theta s1^*$, $\theta s2^*$ are basically the same value to each other, and the information of the angle instruction value used in the automatic steering control is made to be redundant.

Further, a switching switch, which is not shown, is connected to the motor controller 30. An automatic steering mode in which the motor controller 30 executes the automatic steering control is activated or canceled in accordance with operation of the switching switch by a user. When the automatic steering mode is activated, the motor controller 30 executes the automatic steering control, and when intervening of the steering operation (hereinafter, referred to as intervening operation) is performed by a user, the motor controller 30 interrupts the automatic steering control and executes intervening control which assists the steering operation. Further, when the automatic steering mode is canceled, the motor controller 30 executes assist control, which assists the steering operation, instead of the automatic steering control. In this case, the motor controller 30 disables the angle instruction values $\theta s1^*$, $\theta s2^*$ output by the upper-rank controller 40.

Next, an electrical configuration of the vehicle steering system 1 is described together with a function of the motor controller 30.

As shown in FIG. 2, the motor controller 30 includes a first electronic control unit 31 (hereinafter, referred to as a first ECU) which forms a control system for supplying current (driving power) to the first system winding 26 of the motor 20, and a second electronic control unit 32 (hereinafter, referred to as a second ECU) which forms a control system for supplying current (driving power) to the second system winding 27 of the motor 20. The electronic control units 31, 32 are formed as electronic control unit (ECUs) which form the control systems independent to each other.

The torque sensor 50 and the rotation angle sensor 52 are connected to the first ECU 31. The torque value Tm1 is input to the first ECU 31 from the torque sensor 50 via an interface com11 (communication line), and the rotation angle $\theta m1$ is input to the first ECU 31 from the rotation angle sensor 52. Further, the angle instruction value $\theta s1^*$ is input to the first ECU 31 from the upper-rank controller 40 via an interface com12 (communication line). Similarly, the torque sensor 51 and the rotation angle sensor 53 are connected to the second ECU 32. The torque value Tm2 is input to the second ECU 32 from the torque sensor 51 via an interface com21 (communication line), and the rotation angle $\theta m2$ is input to the second ECU 32 from the rotation angle sensor 53. Further, the angle instruction value $\theta s2^*$ is input to the second ECU 32 from the upper-rank controller 40 via an interface com22 (communication line). Independent direct current power sources, which supply current to the system windings 26, 27 respectively, are connected to the ECUs 31, 32 respectively.

The ECUs 31, 32 are connected to each other to mutually transmit and receive information via an interface com13 (communication line) arranged in the first ECU 31 and an interface com23 (communication line) arranged in the second ECU 32 in the motor controller 30. In detail, a plurality of information including at least a torque instruction value described below and the rotation angle is transmitted in one direction from the first ECU 31 to the second ECU 32 at the same time and transmitted in one direction from the second ECU 32 to the first ECU 31 at the same time by means of, for example, serial communication or the like.

The first ECU 31 includes a first calculation processing unit 310, a first drive circuit 311, a first current sensor 312, and a first angle calculation unit 313. Further, the second ECU 32 includes a second calculation processing unit 320, a second drive circuit 321, a second current sensor 322, and a second angle calculation unit 323.

Each of the drive circuits 311, 321 is formed as an inverter circuit having three phases (U-phase, V-phase, and W-phase) and including a plurality of switching elements such as a MOSFET. Each of the drive circuits 311, 321 is formed such that three groups of arms (single-phase half bridge) in which one group is formed by two field effect transistors (FETs) being connected in series, are connected in parallel between a plus terminal and a minus terminal of the direct current power source.

The current sensors 312, 322 detect phase current values I1, I2 as current values of respective phases flowing in power supply paths between the drive circuits 311, 321 and the system windings 26, 27, respectively.

The angle calculation units 313, 323 respectively calculate the rotation angles $\theta m1$, $\theta m2$, which indicate the rotation angle of the rotation shaft 21 of the motor 20, based on the digital values V1, V2 output from the rotation angle sensors 52, 53.

The first calculation processing unit 310 receives each value from the torque sensor 50, the rotation angle sensor 52 (the first angle calculation unit 313) and the first current sensor 312 together with the upper-rank controller 40 by executing cyclic processing in predetermined control cycles. Further, the first calculation processing unit 310 generates a first PWM signal P1 through the cyclic processing and executes PWM control to the first drive circuit 311 (the first system winding 26) as a control subject. Similarly, the second calculation processing unit 320 receives each value from the torque sensor 51, the rotation angle sensor 53 (the second angle calculation unit 323) and the second current sensor 322 together with the upper-rank controller 40 by executing the cyclic processing in predetermined control cycles. Further, the second calculation processing unit 320 generates a second PWM signal P2 through the cyclic processing and executes the PWM control to the second drive circuit 321 (the second system winding 27) as a control subject.

Further, the calculation processing units 310, 320 receive information necessary to each other. Each of the calculation processing units 310, 320 receives the information or the like relating to the instruction value, the detection result of the sensor, an abnormality of the opposite calculation processing unit through the opposite calculation processing unit.

Next, the function of the first calculation processing unit 310 and the second calculation processing unit 320 will be described in detail.

Figure 3:
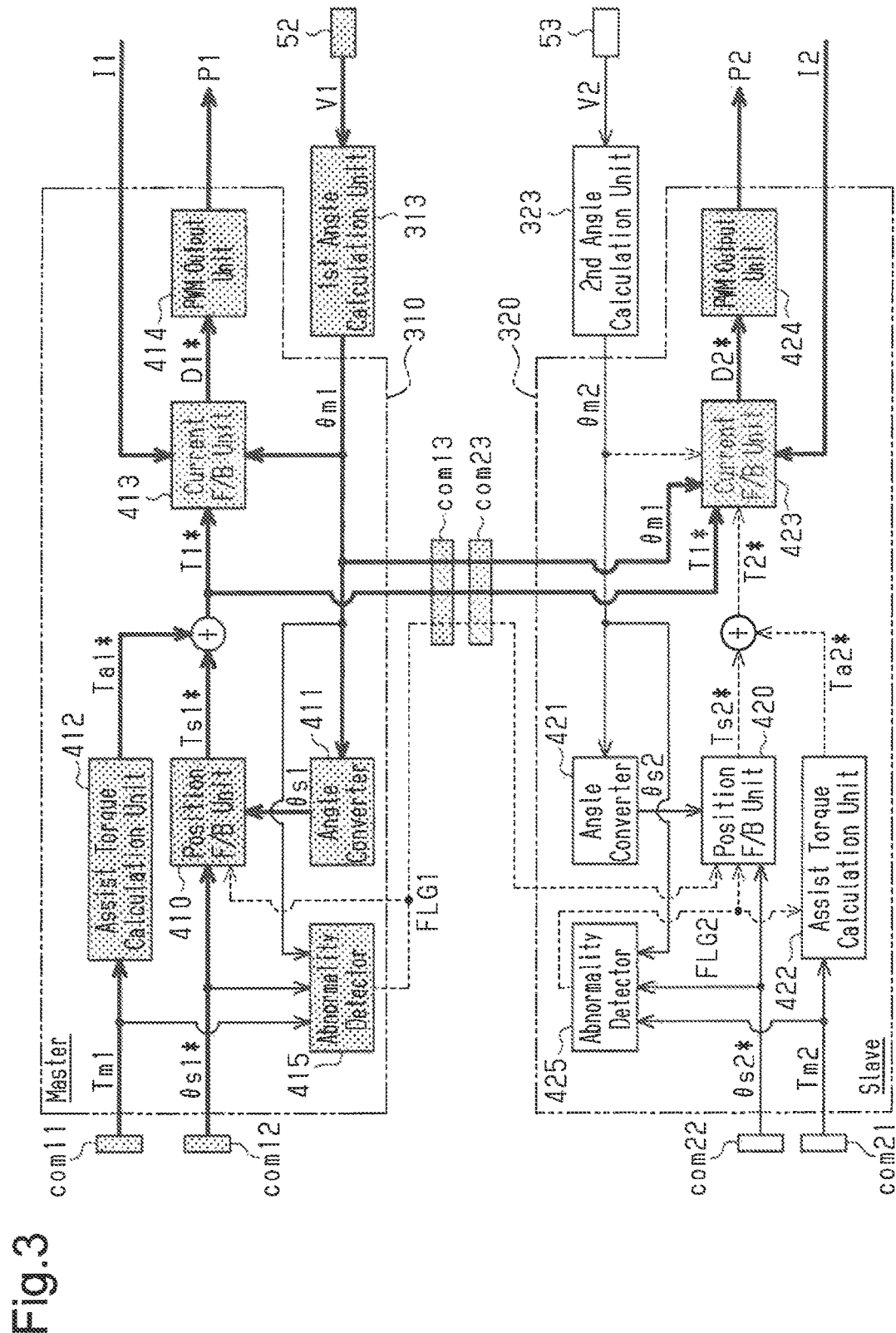
FIG. 3 is a block diagram illustrating the function of a first calculation processing unit and a second calculation processing unit in a motor controller of the electric power steering device shown in FIG. 1.

As shown in FIG. 3, each of the calculation processing units 310, 320 is formed as, for example, a micro processing unit (MPU) formed of one or more of central processing units (CPUs), and each of the calculation processing units 310, 320 is one example of "calculation unit" in the claims. Each of the calculation processing units 310, 320 may be formed as circuitry including one of 1) one or more of dedicated hardware circuits such as ASIC, 2) one or more of processors executed in accordance with a computer program (software), and 3) a combination thereof. The processor includes a CPU and a memory such as a RAM and a ROM, and the memory stores a program code or an instruction formed to make the CPU execute the processing. The memory, namely a computer readable medium, includes any usable medium accessible by a general purpose computer or a dedicated computer.

The calculation processing units 310, 320 include position feedback calculation units (hereinafter, referred to as position F/B unit) 410, 420, angle converters 411, 421, assist torque calculation units 412, 422, current feedback calculation units (hereinafter, referred to as current F/B unit) 413, 423, PWM output units 414, 424, and abnormality detectors 415, 425, respectively.

The position F/B units 410, 420 calculate automatic steering torque components Ts1*, Ts2* based on an angle deviation which is difference between the angle instruction values θs1*, θs2* obtained from the upper-rank controller 40 and the actual angles θs1, θs2 obtained through the angle converters 411, 421, respectively. The automatic steering torque components Ts1*, Ts2* are target values of current amounts corresponding to automatic steering torque (power) to be generated in the motor 20 through the system windings 26, 27. That is, the automatic steering torque components Ts1*, Ts2* are the current instruction values.

The angle converters 411, 421 convert the rotation angles θm1, θm2 obtained from the angle calculation units 313, 323 into absolute angles which are angles in an angle range wider than a range between 0 and 360 degrees by integrating the rotation angles θm1, θm2, respectively. Further, the angle converters 411, 421 calculate the actual angles θs1, θs2 by multiplying the rotation angles θm1, θm2 converted into the absolute angles and coefficients, respectively. The coefficient is defined in accordance with a rotation speed ratio of the speed reduction mechanism 22 and the rotation shaft 21 of the motor 20.

Further, in a case in which it is determined that the intervening operation is generated during the automatic steering mode, the position F/B units 410, 420 output zero values regardless of the values of the automatic steering torque components Ts1*, Ts2*, respectively. Similarly, the position F/B units 410, 420 output zero values respectively because the upper-rank controller 40 disables the output angle instruction values θs1*, θs2* when the automatic steering mode is canceled.

The assist torque calculation units 412, 422 calculate assist torque components Ta1*, Ta2* based on the torque values Tm1, Tm2 obtained from the torque sensors 50, 51, respectively. The assist torque components Ta1*, Ta2* are target values of current amounts corresponding to assist torque (power) to be generated by the motor 20 through the system windings 26, 27, respectively. That is, each of the assist torque components Ta1*, Ta2* is the current instruction value.

Either of a torque instruction value T1* which is an added value of the automatic steering torque component Ts1* and the assist torque component Ta1* calculated by the first ECU 31 and a torque instruction value T2* which is an added value of the automatic steering torque component Ts2* and the assist torque component Ta2* calculated by the second ECU 32 is input to each of the current F/B units 413, 423. Further, the torque instruction value which is the added value of the automatic steering torque component and the assist torque component is the current instruction value.

Further, the current F/B units 413, 423 calculate duty instruction values D1*, D2* of the PWM control based on either of the torque instruction values T1*, T2*, and the rotation angle and the phase current values, respectively. Further, in this case, the rotation angle is obtained by either of the ECUs 31, 32 to which the calculation unit which calculates the input torque instruction value belongs, and the phase current values are obtained by the ECUs 31, 32 to which the current F/B units 413, 423 belong.

The PWM output units 414, 424 calculate the PWM signals P1, P2 based on the duty instruction values D1*, D2* calculated by the corresponding ECUs 31, 32, respectively.

The abnormality detectors 415, 425 have self-diagnosis functions in which whether an abnormality incapable of continuing control relating to the operation of the power supply of the corresponding ECUs 31, 32 to the system windings 26, 27 as power supply targets occurs is self-diagnosed, respectively. The abnormality detectors 415, 425 self-diagnose whether the abnormalities occur in the angle instruction values θs1*, θs2*, the rotation angles θm1, θm2, or the torque values Tm1 Tm2 obtained by the corresponding ECUs 31, 32, respectively.

When the abnormality detectors 415, 425 self-diagnose that the abnormalities occur in the corresponding ECUs 31, 32 respectively, the abnormality detectors 415, 425 output abnormality flags FLG1, FLG2 respectively as a result of the self-diagnosis. Each of the abnormality flags FLG1, FLG2 is output to the position F/B unit and the assist torque calculation unit in the corresponding ECU. Further, the abnormality flag FLG1 output from the abnormality detector 415 of the first ECU 31 is output to the second calculation processing unit 320 (the position F/B unit 420 and the assist torque calculation unit 422) of the second ECU 32 via the interfaces com13, com23. Thus, the calculation processing units 310, 320 (the position F/B units 410, 420 and the assist torque calculation units 412, 422) detect that the abnormalities occur in the corresponding ECUs 31, 32, and especially, the second calculation processing unit 320 detects that an abnormality is included in the first ECU 31.

In the present embodiment, the abnormality detector 415 and the abnormality detector 425 do not detect the abnormality at the same time. When both of the ECUs 31, 32 are normal, the first ECU 31, namely the first calculation processing unit 310, functions as a master, and the second ECU 32, namely the second calculation processing unit 320, functions as a slave. In this case, the torque instruction value T1* calculated by the first calculation processing unit 310 serving as the master and the rotation angle θm1 detected by the rotation angle sensor 52 connected to the first ECU 31 to which the first calculation processing unit 310 serving as the master belongs are used in the calculation of the PWM signals P1, P2 in the calculation processing units 310, 320.

Thus, the calculation processing units 310, 320 perform in a synchronization manner to calculate the PWM signals P1, P2 being synchronized in phase to each other, and the calculation processing units 310, 320 supply the same amount of current to the drive circuits 311, 321 (the system windings 26, 27) at basically the same timing, respectively. That is, the same torque instruction value and the same rotation angle are used in the calculation of the PWM signals P1, P2 in the calculation processing units 310, 320, and therefore the torque instruction value is used such that it is calculated that the total amount of the current amount flowing from the drive circuit 311 to the system winding 26 and the current amount flowing from the drive circuit 321 to the system winding 27 is equal to the necessary current amount. The torque instruction value in the present embodiment is calculated as a target value of the current amount corresponding to one-half (50%) of the total torque to be generated in the motor 20.

Specifically, as shown by a bold line in FIG. 3, the first calculation processing unit 310 as the master outputs the torque value T1*, which is an added value of the automatic steering torque component Ts1* calculated by the position F/B unit 410 and the assist torque component Ta1* calculated by the assist torque calculation unit 412, to the current F/B unit 413. At the same time, the first calculation processing unit 310 as the master outputs the torque instruction value T1* to the current F/B unit 423 of the second calculation processing unit 320 as the slave via the interfaces com13, com23 and outputs the rotation angle θm1 to the current F/B unit 423 of the second calculation processing unit 320 as the slave via the interfaces com13, com23.

Further, the first calculation processing unit 310 as the master executes the PWM control to the first drive circuit 311 (the first system winding 26) as a control subject by using the torque instruction value T1* calculated by the first calculation processing unit 310 and the rotation angle θm1 detected through the rotation angle sensor 52 connected to the corresponding first ECU 31. Further, the second calculation processing unit 320 as the slave executes the PWM control to the second drive circuit 321 (the second system winding 27) as the control subject by using the torque instruction value T1* calculated by the first calculation processing unit 310 as the master and the rotation angle θm1 detected through the rotation angle sensor 52 connected to the first ECU 31 to which the first calculation processing unit 310 as the master belongs.

In FIG. 3, blocks with dots execute various processing. In detail, in the first calculation processing unit 310, in order to output the first PWM signal P1, the position F/B unit 410, the angle converter 411 (the first angle calculation unit 313 (the rotation angle sensor 52)), the assist torque calculation unit 412, the current F/B unit 413, and the PWM output unit 414 execute the various processing. Further, in the second calculation processing unit 320, in order to output the second PWM signal P2, the current F/B unit 423 and the PWM output unit 424 execute the various processing.

In FIG. 3, blocks without dots are disabled. In detail, in the second calculation processing unit 320, the position F/B unit 420 and the assist torque calculation unit 422 are disabled to output necessary information for outputting the second PWM signal P2. In this case, the angle instruction value θs2* and the actual angle θs2 are input to the position F/B unit 420, however the position F/B unit 420 does not output the automatic steering torque component Ts2*. Further, the torque value Tm2 is input to the assist torque calculation unit 422, however the assist torque calculation unit 422 does not output the assist torque component Ta2*. Here, the position F/B unit 420 and the assist torque calculation unit 422 may or may not calculate the automatic steering torque component Ts2* and the assist torque component Ta2*.

Further, as shown by the blocks with dots in FIG. 3, in the first calculation processing unit 310, the abnormality detector 415 self-diagnoses whether an abnormality is included in the first ECU 31. In this case, the abnormality detector 415 executes abnormality detection processing by executing the cyclic processing in each control cycle of the first calculation processing unit 310.

Figure 4:
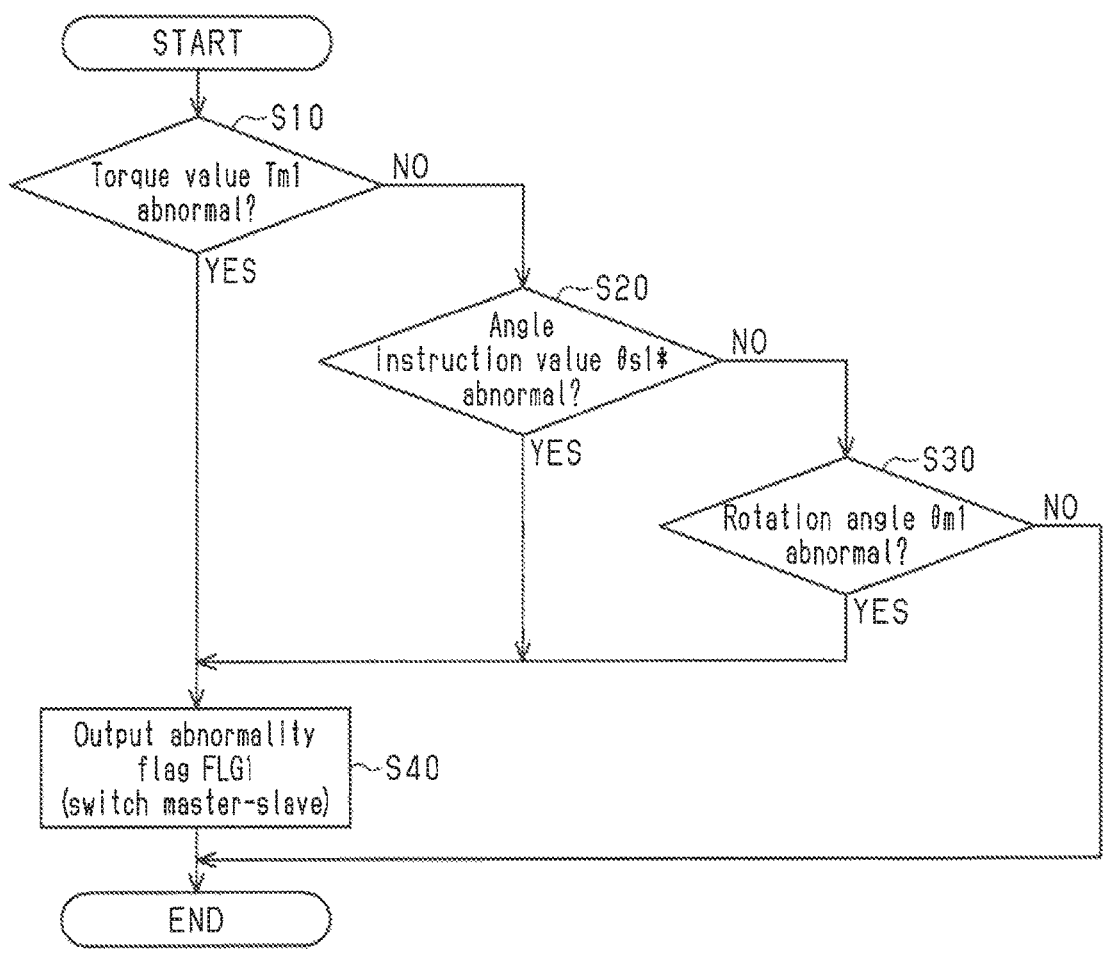
FIG. 4 is a flowchart illustrating the flow of abnormality detection processing executed by an abnormality detector in the motor controller shown in FIG. 3.

Specifically, as shown in FIG. 4, in the abnormality detection processing, the abnormality detector 415 of the first calculation processing unit 310 acquires the torque value Tm1 input via the interface com11, the angle instruction value θs1* input via the interface com12, and the rotation angle θm1 obtained through the first angle calculation unit 313, respectively.

Further, the abnormality detector 415 determines whether an abnormality exists in the torque value Tm1 which is the detection result of the torque sensor 50 (S10).

In S10, if the abnormality detector 415 determines that the abnormality does not exist in the torque value Tm1 which is the detection result of the torque sensor 50 (S10: NO), the abnormality detector 415 determines whether an abnormality exists in the angle instruction value θs1* input from the upper-rank controller 40 (S20).

In S20, if the abnormality detector 415 determines that the abnormality does not exist in the angle instruction value θs1* input from the upper-rank controller 40 (S20: NO), the abnormality detector 415 determines whether the abnormality exists in the rotation angle θm1 which is the detection result of the rotation angle sensor 52 (S30).

In S30, if the abnormality detector 415 determines that the abnormality does not exist in the rotation angle θm1 which is the detection result of the rotation angle sensor 52 (S30: NO), the abnormality detector 415 ends the abnormality detection processing.

In S10, S20, and S30, the abnormality detector 415 determines whether the torque value Tm1, the angle instruction value θs1*, and the rotation angle θm1 are input in predetermined cycles respectively and determines whether the torque value Tm1, the angle instruction value θs1*, and the rotation angle θm1 are reasonable based on comparison between each of the input values and each of previous values thereof, calculation of a root mean square, or the like.

Figure 5:
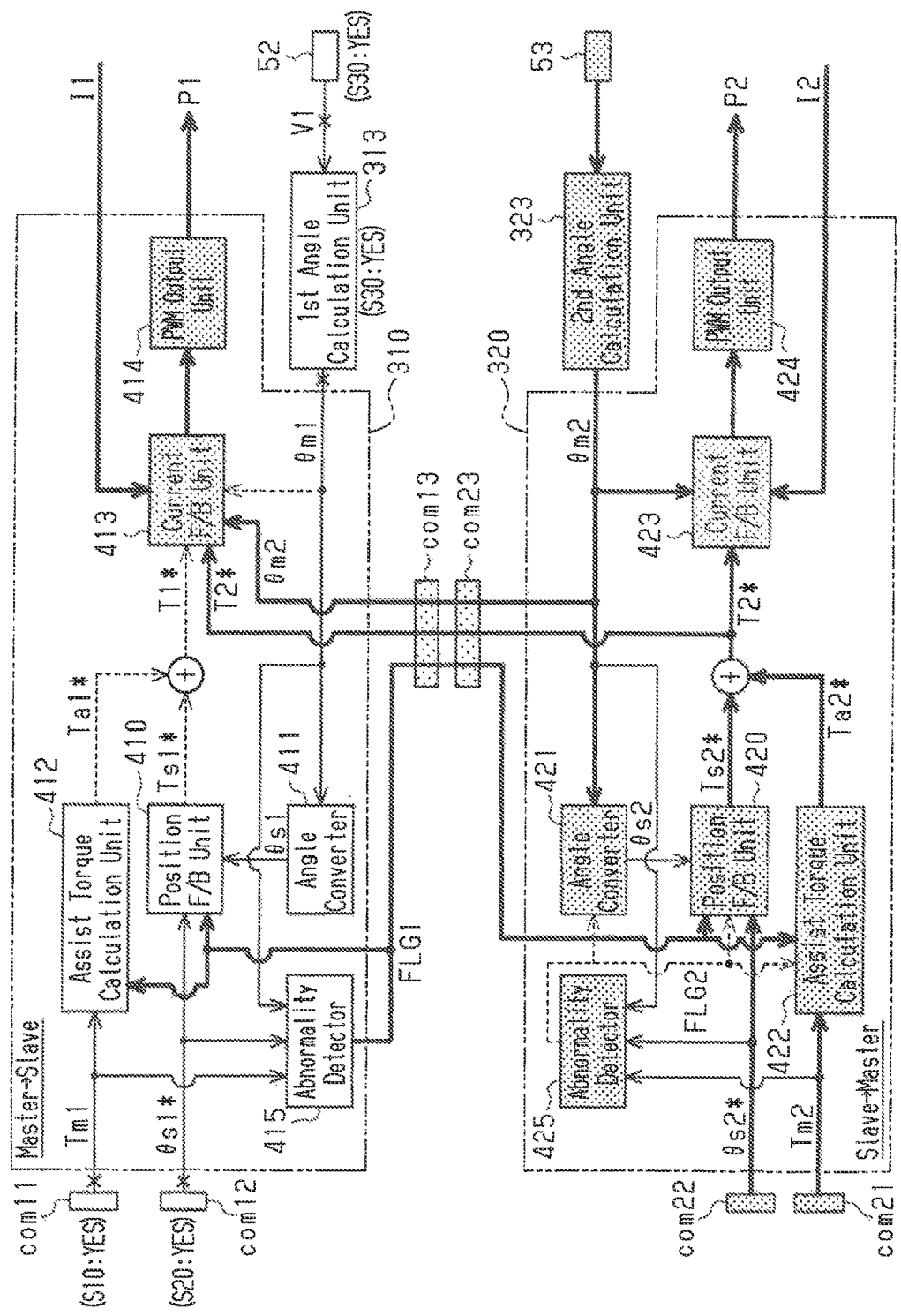
FIG. 5 is a block diagram illustrating the function of the first calculation processing unit and the second calculation processing unit when an abnormality is included in the first calculation processing unit shown in FIG. 3.

If the torque value Tm1 is not input in predetermined cycles, it is likely that disconnection of the interface com11 occurs as shown by an X mark in FIG. 5. If the torque value Tm1 is not reasonable, it is likely that a sensor abnormality of the torque sensor 50 occurs. Further, if the angle instruction value θs1* is not input in predetermined cycles, it is likely that disconnection of the interface com12 occurs as shown by an X mark in FIG. 5. If the angle instruction value θs1* is not reasonable, it is likely that a calculation abnormality of the upper-rank controller 40 occurs. Further, if the rotation angle θm1 is not input in predetermined cycles, it is likely that disconnection of the rotation angle sensor 52 or the first angle calculation unit 313 occurs as shown by an X mark in FIG. 5. Further, if the rotation angle θm1 is not reasonable, it is likely that a sensor abnormality of the rotation angle sensor 52 or a calculation abnormality of the first angle calculation unit 313 occurs.

Further, if the abnormality detector 415 determines that an abnormality is included in the torque value Tm1, the angle instruction value θs1*, or the rotation angle θm1 (S10: YES, S20: YES, or S30: YES), the abnormality detector 415 outputs the abnormality flag FLG1 (S40). In S40, the abnormality detector 415 outputs the abnormality flag FLG1 to the position F/B unit 410 and the assist torque calculation unit 412 of the first calculation processing unit 310. Further, in this case, the abnormality detector 415 outputs the abnormality flag FLG1 to the position F/B unit 420 and the assist torque calculation unit 422 of the second calculation processing unit 320 via the interfaces com13, com23. After that, the abnormality detector 415 ends the abnormality detection processing.

In the present embodiment, after the abnormality flag FLG1 is output, a control state of the calculation processing units 310, 320 is switched from a control state in which the first calculation processing unit 310 serves as the master and the second calculation processing unit 320 serves as the slave, into a control state in which the second calculation processing unit 320 serves as the master and the first calculation processing unit 310 serves as the slave. That is, the master and the slave are switched.

In this case, the calculation processing units 310, 320 calculate the PWM signals P1, P2 by using the torque instruction value T2* calculated by the second calculation processing unit 320 serving as the master and the rotation angle θm2 detected by the rotation angle sensor 53 connected to the second ECU 32 to which the second calculation processing unit 320 serving as the master belongs.

Specifically, in FIG. 5, blocks with dots execute various processing. In detail, in the second calculation processing unit 320, in order to output the second PWM signal P2, the position F/B unit 420, the angle converter 421 (the second angle calculation unit 323 (the rotation angle sensor 53)), the assist torque calculation unit 422, the current F/B unit 423, and the PWM output unit 424 execute the various processing. Further, in the first calculation processing unit 310, in order to output the first PWM signal P1, the current F/B unit 413 and the PWM output unit 414 execute the various processing.

In FIG. 5, the blocks without dots are disabled. In detail, the position F/B unit 410 of the first calculation processing unit 310 serving as the slave is disabled to output the automatic steering torque component Ts1* after the abnormality flag FLG1 is input. Further, the assist torque calculation unit 412 of the first calculation processing unit 310 serving as the slave is disabled to output the assist torque component Ta1* after the abnormality flag FLG1 is input. In this case, the angle instruction value θs1* and the actual angle θs1 are input to the position F/B unit 410, however the position F/B unit 410 does not output the automatic steering torque component Ts1*. Further, the torque value Tm1 is input to the assist torque calculation unit 412, however the assist torque calculation unit 412 does not output the assist torque component Ta1*. Here, the position F/B unit 410 and the assist torque calculation unit 412 may or may not calculate the automatic steering torque component Ts1* and the assist torque component Ta1*.

Further, the second calculation processing unit 320 serving as the master executes the PWM control to the second drive circuit 321 (the second system winding 27) as a control subject by using the torque instruction value T2* calculated by the second calculation processing unit 320 and the rotation angle θm2 detected through the rotation angle sensor 53 connected to the corresponding second ECU 32. Further, the first calculation processing unit 310 serving as the slave executes the PWM control to the first drive circuit 311 (the first system winding 26) as a control subject by using the torque instruction value T2* calculated by the second calculation processing unit 320 serving as the master and the rotation angle θm2 detected through the rotation angle sensor 53 connected to the second ECU 32 to which the second calculation processing unit 320 serving as the master belongs.

In this way, the motor controller 30 includes the first and the second ECUs 31, 32, and the torque sensors 50, 51 and the rotation angle sensors 52, 53 are connected to the first and the second ECUs 31, 32 respectively. Further, the angle instruction values θs1*, θs2* are input to the first and the second ECUs 31, 32 respectively, and thereby the control relating to the operation of the motor 20 (the system windings 26, 27) is made to be redundant.

Further, as shown by the blocks with dots in FIG. 5, in the second calculation processing unit 320, the abnormality detector 425 self-diagnoses whether an abnormality is included in the second ECU 32. In this case, the abnormality detector 425 executes the abnormality detection processing (shown in FIG. 4), which is similar to that executed by the abnormality detector 415, by executing the cyclic processing in each control cycle of the second calculation processing unit 320.

Further, if the abnormality detector 425 determines that an abnormality is included in the torque value Tm2, the angle instruction value θs2*, or the rotation angle θm2, the abnormality detector 425 outputs the abnormality flag FLG2. The abnormality detector 425 outputs the abnormality flag FLG2 to the position F/B unit 420 and the assist torque calculation unit 422 of the second calculation processing unit 320.

For example, during a period in which the second calculation processing unit 320 serves as the master and the first calculation processing unit 310 serves as the slave, the position F/B unit 420 of the second calculation processing unit 320 is disabled to output the automatic steering torque component Ts2* after the abnormality flag FLG2 is input. Further, in this case, the assist torque calculation unit 422 of the second calculation processing unit 320 is disabled to output the assist torque component Ta2* after the abnormality flag FLG2 is input. Accordingly, if the abnormality that occurs in both of the ECUs 31, 32 is detected, the control state of the calculation processing units 310, 320 is switched from the control state in which the second calculation processing unit 320 serves as the master and the first calculation processing unit 310 serves as the slave, into a control state in which the control of the operation of the motor 20 is stopped.

Here, the abnormality of the second ECU 32 may occur before the abnormality of the first ECU 31 occurs. In this case, when it is detected that the abnormality of the first ECU 31 occurs, the control state of the calculation processing units 310, 320 is switched from the control state in which the first calculation processing unit 310 serves as the master and the second calculation processing unit 320 serves as the slave, into the control state in which the control of the operation of the motor 20 is stopped.

The present embodiment has the advantages described below.

(1) If the calculation processing units 310, 320 of the ECUs 31, 32 have a master-slave relationship as described in the present embodiment, when an abnormality is included in the detection result of the rotation angle sensor connected to the calculation processing unit serving as the master, the operation of the drive circuit cannot be controlled appropriately. However, even if an abnormality is included in the detection result of the rotation angle sensor connected to the calculation processing unit serving as the master, the abnormality may not be included in the detection result of the rotation angle sensor connected to the calculation processing unit serving as the slave.

In this respect, as shown in FIGS. 3 and 5, for example, if the first calculation processing unit 310 serves as the master, when an abnormality is included in the detection result of the rotation angle sensor 52 connected to the first calculation processing unit 310, the control state is switched such that the first and the second calculation processing units 310, 320 control the corresponding drive circuits 311, 321 by using the detection result of the rotation angle sensor 53 connected to the second calculation processing unit 320 serving as the slave instead of the detection result of the rotation angle sensor 52.

In this case, when an abnormality is included in the detection result of the rotation angle sensor 52 connected to the first calculation processing unit 310 serving as the master, the control of the operation of the drive circuits 311, 321 of the ECUs 31, 32 can be continued by using the detection result of the rotation angle sensor 53 connected to the second calculation processing unit 320 serving as the slave instead of the detection result of the rotation angle sensor 52. Accordingly, when an abnormality is included in the first ECU 31 to which the first calculation processing unit 310 serving as the master belongs, the output of the motor 20 can be maintained and a decrease in the entire output of the motor 20 can be minimized.

(2) Further, if the first calculation processing unit 310 serves as the master, when an abnormality is included in the detection result of the rotation angle sensor 52 connected to the first calculation processing unit 310, instead of the first calculation processing unit 310 serving as the master, the second calculation processing unit 320 serving as the slave outputs the torque instruction value T2* and the rotation angle θm2 to the first calculation processing unit 310. That is, the control state of the calculation processing units 310, 320 is switched from the control state in which the first calculation processing unit 310 serves as the master and the second calculation processing unit 320 serves as the slave to the control state in which the second calculation processing unit 320 serves as the master and the first calculation processing unit 310 serves as the slave.

Specifically, as shown by the bold line in FIG. 5, the position F/B unit 420 of the second calculation processing unit 320 serving as the master calculates the automatic steering torque component Ts2* by using the angle instruction value θs2* and the actual angle θs2 after the abnormality flag FLG1 is input. Similarly, the assist torque calculation unit 422 calculates the assist torque component Ta2* by using the torque value Tm2 after the abnormality flag FLG1 is input. Further, the second calculation processing unit 320 outputs the torque instruction value T2*, which is the added value of the automatic steering torque component Ts2* calculated by the position F/B unit 420 and the assist torque component Ta2* calculated by the assist torque calculation unit 422, to the current F/B unit 423. At the same time, the second calculation processing unit 320 serving as the master outputs the torque instruction value T2* to the current F/B unit 413 of the first calculation processing unit 310 serving as the slave via the interfaces com13, com23 and outputs the rotation angle θm2 to the current F/B unit 413 of the first calculation processing unit 310 serving as the slave via the interfaces com13, com23.

In this way, according to the present embodiment, if the detection result of the rotation angle sensor 53 connected to the second calculation processing unit 320 is used instead of the detection result of the rotation angle sensor 52 connected to the first calculation processing unit 310, there is no need to transmit the information back and forth between the calculation processing units 310, 320 as the information transmission between the calculation processing units 310, 320.

Thus, when the calculation processing units 310, 320 execute the cyclic processing after an abnormality is included in the detection result of the rotation angle sensor 52 connected to the first calculation processing unit 310, the first calculation processing unit 310 can obtain the torque instruction value T2* and the rotation angle θm2 in the same cycle in the cyclic processing from the second calculation processing unit 320. Accordingly, when an abnormality is included in the first ECU 31 to which the first calculation processing unit 310 serving as the master belongs, the output of the motor 20 can be controlled appropriately.

(3) Further, if the first calculation processing unit 310 serves as the master, when an abnormality is included in the detection result of the rotation angle sensor 52 connected to the first calculation processing unit 310, the torque instruction value T2* and the rotation angle θm2 are output from the second calculation processing unit 320 to the first calculation processing unit 310 by using the interfaces com13, com23. Thus, a decrease in the entire output of the motor 20 can be minimized when an abnormality is included in the first ECU 31 to which the first calculation processing unit 310 serving as the master belongs, and modification of hardware such as the addition of an interface (communication line) can be reduced.

(4) Further, if the first calculation processing unit 310 serves as the master, when an abnormality is included in the detection result of the rotation angle sensor 52, the first calculation processing unit 310 outputs the abnormality flag FLG1, which indicates that the occurrence of the abnormality, by using the interfaces com13, com23 which are the same interfaces for transmitting and receiving the torque instruction value and the rotation angle. Thus, a decrease in the entire output of the motor 20 can be minimized when an abnormality is included in the first ECU 31 to which the first calculation processing unit 310 serving as the master belongs, and the modification of hardware such as the addition of an interface (communication line connected to the interface) can be reduced.

(5) According to the present embodiment, if the first calculation processing unit 310 serves as the master as described above, the motor controller 30 is able to stabilize application of the power to the steering mechanism 2 by minimizing a decrease in the entire output of the motor 20 even when an abnormality is included in the first ECU 31 to which the first calculation processing unit 310 belongs. Further, in the vehicle steering system 1 obtained by using the motor controller 30, the reliability of the power applied to the steering mechanism 2 can be improved.

(6) If the calculation processing units 310, 320 of the ECUs 31, 32 have the master-slave relationship as described in the present embodiment, when an abnormality is included in the angle instruction value input from the upper-rank controller 40 as an external device to the calculation processing unit serving as the master, the torque instruction value (automatic steering torque component) cannot be calculated appropriately. However, even if an abnormality is included in the angle instruction value input to the calculation processing unit serving as the master, an abnormality may not be included in the angle instruction value input to the calculation processing unit serving as the slave.

In this respect, as shown in FIGS. 3 and 5, for example, if the first calculation processing unit 310 serves as the master, when an abnormality is included in the angle instruction value $\theta s1^*$ input to the first calculation processing unit 310, the control state is switched such that the second calculation processing unit 320 serving as the slave calculates the torque instruction value by using the angle instruction value $\theta s2^*$ input to the second calculation processing unit 320 instead of the angle instruction value $\theta s1^*$.

In this case, even if an abnormality is included in the angle instruction value $\theta s1^*$ input from the upper-rank controller 40 to the first calculation processing unit 310 serving as the master, the calculation of the torque instruction value can be continued by using the angle instruction value $\theta s2^*$ input from the upper-rank controller 40 to the second calculation processing unit 320 serving as the slave instead of the angle instruction value $\theta s1^*$. Thus, when an abnormality is included in the first ECU 31 to which the first calculation processing unit 310 serving as the master belongs, the output of the motor 20 can be maintained, and a decrease in the entire output of the motor 20 can be minimized.

(7) Further, if the first calculation processing unit 310 serves as the master, when an abnormality is included in the angle instruction value $\theta s1^*$ input to the first calculation processing unit 310, instead of the first calculation processing unit 310 serving as the master, the second calculation processing unit 320 serving as the slave outputs the torque instruction value T2* and the rotation angle $\theta m2$ to the first calculation processing unit 310. That is, the control state of the calculation processing units 310, 320 is switched from the control state in which the first calculation processing unit 310 serves as the master and the second calculation processing unit 320 serves as the slave to the control state in which the second calculation processing unit 320 serves as the master and the first calculation processing unit 310 serves as the slave.

Specifically, as shown by the bold line in FIG. 5, the position F/B unit 420 of the second calculation processing unit 320 serving as the master calculates the automatic steering torque component Ts2* by using the angle instruction value $\theta s2^*$ and the actual angle $\theta s2$ after the abnormality flag FLG1 is input. Similarly, the assist torque calculation unit 422 calculates the assist torque component Ta2* by using the torque value Tm2 after the abnormality flag FLG1 is input. Further, the second calculation processing unit 320 outputs the torque instruction value T2*, which is the added value of the automatic steering torque component Ts2* calculated by the position F/B unit 420 and the assist torque component Ta2* calculated by the assist torque calculation unit 422, to the current F/B unit 423. At the same time, the second calculation processing unit 320 serving as the master outputs the torque instruction value T2* to the current F/B unit 413 of the first calculation processing unit 310 serving as the slave via the interfaces com13, com23 and outputs the rotation angle $\theta m2$ to the current F/B unit 413 of the first calculation processing unit 310 serving as the slave via the interfaces com13, com23.

In this way, according to the present embodiment, if the angle instruction value $\theta s2^*$ input to the second calculation processing unit 320 is used instead of the angle instruction value $\theta s1^*$ input to the first calculation processing unit 310, it is not necessary to transmit the information back and forth between the calculation processing units 310, 320 as the information transmission between the calculation processing units 310, 320.

Thus, when the calculation processing units 310, 320 execute the cyclic processing after an abnormality is included in the angle instruction value $\theta s1^*$ input to the first calculation processing unit 310, the first calculation processing unit 310 can obtain the torque instruction value T2* and the rotation angle $\theta m2$ in the same cycle in the cyclic processing from the second calculation processing unit 320. Accordingly, even when an abnormality is included in the first ECU 31 to which the first calculation processing unit 310 serving as the master belongs, the output of the motor 20 can be controlled appropriately.

(8) Further, if the first calculation processing unit 310 serves as the master, when an abnormality is included in the angle instruction value $\theta s1^*$ input to the first calculation processing unit 310, the torque instruction value T2* and the rotation angle $\theta m2$ are output from the second calculation processing unit 320 to the first calculation processing unit 310 by using the interfaces com13, com23. Thus, a decrease in the entire output of the motor 20 can be minimized when an abnormality is included in the first ECU 31 to which the first calculation processing unit 310 serving as the master belongs, and the modification of hardware such as the addition of an interface (communication line) can be reduced.

(9) Further, if the first calculation processing unit 310 serves as the master, when an abnormality is included in the angle instruction value $\theta s1^*$, the first calculation processing unit 310 outputs the abnormality flag FLG1, which indicates the occurrence of an abnormality, by using the interfaces com13, com23 which are the same interfaces for transmitting and receiving the torque instruction value and the rotation angle. Thus, a decrease in the entire output of the motor 20 can be minimized when an abnormality is included in the first ECU 31 to which the first calculation processing unit 310 serving as the master belongs, and the modification of hardware such as the addition of an interface (communication line connected to the interface) can be further reduced.

(10) According to the present embodiment, if the first calculation processing unit 310 serves as the master as described above, the motor controller 30 is able to stabilize the power applied to the steering mechanism 2 by minimizing a decrease in the entire output of the motor 20 even when an abnormality is included in the first ECU 31 to which the first calculation processing unit 310 belongs. Further, in the vehicle steering system 1 obtained by using the motor controller 30, the reliability of the power applied to the steering mechanism 2 can be improved.

It should be apparent to those skilled in the art that the present invention may be embodied in many other specific forms without departing from the spirit or scope of the invention. Particularly, it should be understood that the present invention may be embodied in the following forms.

The detection whether an abnormality is included in the ECUs 31, 32 may be executed by only either of the calculation processing units 310, 320. Further, the abnormality flag FLG1 output by the abnormality detector 415 of the first ECU 31 may be output to the second ECU 32 (the second calculation processing unit 320) via a dedicated interface (communication line) different from the interfaces com13, com23. Even in these cases, when an abnormality is included in the first ECU 31 to which the first calculation processing unit 310 serving as the master belongs, a decrease in the entire output of the motor 20 can be minimized.

A specific configuration of the ECUs 31, 32 may be modified as long as the ECUs 31, 32 are connected such that information can be transmitted and received to each other in the motor controller 30. For example, communication of the information from the first ECU 31 to the second ECU 32 and communication of the information from the second ECU 32 to the first ECU 31 may be executed via dedicated interfaces (communication line) to be able to transmit and receive the information, respectively.

For example, if the first calculation processing unit 310 serves as the master, the information obtained in the second calculation processing unit 320 may be used instead of only the information in which the abnormality occurs. That is, when an abnormality is included in the torque value Tm1, in the calculation of the PWM signals P1, P2 in the calculation processing units 310, 320, the torque value Tm2 obtained in the second calculation processing unit 320 may be used instead of the torque value Tm1. Further, when an abnormality is included in the angle instruction value $\theta s1^*$, in the calculation of the PWM signals P1, P2 in the calculation processing units 310, 320, the angle instruction value $\theta s2^*$ obtained in the second calculation processing unit 320 may be used instead of the angle instruction value $\theta s1^*$. Further, when an abnormality is included in the rotation angle $\theta m1$, in the calculation of the PWM signals P1, P2 in the calculation processing units 310, 320, the rotation angle $\theta m2$ obtained in the second calculation processing unit 320 may be used instead of the rotation angle $\theta m1$. In these cases, even if an abnormality is included in the torque value Tm1, the angle instruction value $\theta s1^*$, or the rotation angle $\theta m1$, the relationship in which the first calculation processing unit 310 serves as the master and the second calculation processing unit 320 serves as the slave can be maintained. Also in this case, when an abnormality is included in the first ECU 31 to which the first calculation processing unit 310 serving as the master belongs, a decrease in the entire output of the motor 20 can be minimized.

In the motor controller 30, the detection results of the torque sensors 50, 51, and the angle instruction values $\theta s1^*$, $\theta s2^*$ input from the upper-rank controller 40 may not be made to be redundant if the detection results of the rotation angle sensors 52, 53 are made to be redundant.

In the motor controller 30, the detection results of the torque sensors 50, 51 and the detection results of the rotation angle sensors 52, 53 may not be made to be redundant if the angle instruction values $\theta s1^*$, $\theta s2^*$ input from the upper-rank controller 40 are made to be redundant.

At least a small amount of torque may be generated in the motor 20 via the first drive circuit 311 (the first system winding 26) when an abnormality is included in the first ECU 31. In this case, a decrease in the entire output of the motor 20 can be minimized compared to a case in which current supply from the first drive circuit 311 to the first system winding 26 is interrupted.

In the motor controller 30, a plurality of control systems (ECU) may be formed, and therefore three control systems or four or more control systems may be formed. In this case, a configuration in which the number of the calculation processing units (drive circuit or the like) is increased in accordance with the number of the control systems, and the torque value, the angle instruction value, and the rotation angle are independently input to each of the control systems, and one of the control systems serves as the master to control the actuation of the motor 20, may be adopted.

In the control of the motor 20, as the actual angle $\theta s$, the steering angle as the rotation angle of the column shaft 11a, a pinion angle as the rotation angle of the pinion shaft 11c, or a moving position of the rack shaft 12 may be used. In these cases, each of the torque values Tm1, Tm2 can be also calculated by applying processing to the steering angle or the like. Thus, the torque sensors 50, 51 can be omitted, and therefore the number of parts and cost can be reduced.

In the vehicle steering system 1, it may be switched from the automatic steering control to the assist control if the intervening operation is generated during a period in which the automatic steering mode is set.

The upper-rank controller 40 may be formed to output the angle deviation instead of the angle instruction values $\theta s1^*$, $\theta s2^*$ to the motor controller 30. In this case, the upper-rank controller 40 may be formed to calculate the angle deviation based on the rotation angles $\theta m1$, $\theta m2$ obtained from the rotation angle sensors 52, 53, the steering angle described above or the like.

In the calculation of the assist torque components Ta1*, Ta2*, a vehicle speed of the vehicle A may be used as long as the torque values Tm1, Tm2 are used. Further, in the calculation of the assist torque components Ta1*, Ta2*, the torque values Tm1, Tm2 and the vehicle speed may be used together with other elements other than the torque values Tm1, Tm2 and the vehicle speed. Further, in the calculation of the automatic steering torque components Ts1*, Ts2*, the angle instruction values $\theta s1^*$, $\theta s2^*$ may be used together with the vehicle speed or other element other than the vehicle speed as long as the angle instruction values $\theta s1^*$, $\theta s2^*$ calculated based on the vehicle peripheral environment (the angle information $\theta v$) is used.

The vehicle steering system 1 may have, for example, a function to form a side slip prevention device (vehicle stability control), or a function to form the lane deviation prevention assist system together with the side slip prevention device as other function to assist the travel of the vehicle.

In the embodiment described above, the vehicle steering system 1 is applied to a configuration in which the power is applied to the column shaft 11a, however the vehicle steering system 1 may be applied to a configuration in which the power is applied to the rack shaft 12. In this case, each of the torque sensors 50, 51 may be formed on, for example, the pinion shaft 11c.

In the embodiment described above, the control subject is set to the motor 20 of the vehicle steering system 1, however it is not limited to this. For example, the control subject may be set to a motor of a steer-by-wire type steering device, a motor of a rear wheel steering device or a four-wheel steering device (4WS). Further, in the embodiment described above, the control subject may be set to a motor of a steering device which executes only assist control which assists steering operation without executing the automatic steering control. Further, in the embodiment described above, the control subject may be set to a motor mounted on a device other than vehicles.

Each of the modified examples may be combined to each other, and, for example, the modified example of the steer-by-wire type steering device and other modified example may be combined to each other.

Therefore, the present examples and embodiments are to be considered as illustrative and not restrictive and the invention is not to be limited to the details given herein, but may be modified within the scope and equivalence of the appended claims.

The invention claimed is:

1. A motor controller comprising a plurality of control systems configured to control actuation of a motor including windings of a plurality of systems, wherein:
   the control systems each include a drive circuit configured to supply current to a corresponding winding and a calculation unit combined with the drive circuit;
   the calculation unit of each of the control systems is connected to an independent rotation angle sensor that detects a rotation angle of the motor;
   the calculation units include a master calculation unit and a slave calculation unit;
   the master calculation unit is configured to calculate a current instruction value as a target of a current amount supplied to each of the windings and output a detection result of the rotation angle sensor connected to the master calculation unit, together with the current instruction value, to the slave calculation unit;
   the master calculation unit and the slave calculation unit are each configured to control actuation of the corresponding drive circuit based on the current instruction value and the detection result of the rotation angle sensor connected to the master calculation unit; and
   when an abnormality is included in the detection result of the rotation angle sensor connected to the master calculation unit, the master calculation unit and the slave calculation unit are each configured to use a detection result of the rotation angle sensor connected to the slave calculation unit instead of the detection result of the rotation angle sensor connected to the master calculation unit to control the actuation of the corresponding drive circuit.

2. The motor controller according to claim 1, wherein when an abnormality is included in the detection result of the rotation angle sensor connected to the master calculation unit, the slave calculation unit calculates the current instruction value instead of the master calculation unit and outputs the current instruction value and the detection result of the rotation angle sensor connected to the slave calculation unit to the master calculation unit.

3. The motor controller according to claim 2, further comprising an interface that connects the master calculation unit and the slave calculation unit to each other, wherein:
   the interface includes a first state that allows information to be output from the master calculation unit to the slave calculation unit and a second state that allows information to be output from the slave calculation unit to the master calculation unit; and
   the interface is set to the first state when an abnormality is not included in the detection result of the rotation angle sensor connected to the master calculation unit, and the interface is set to the second state when an abnormality is included in the detection result of the rotation angle sensor connected to the master calculation unit.

4. The motor controller according to claim 3, wherein the master calculation unit includes an abnormality detector that detects that an abnormality is included in the detection result of the rotation angle sensor connected to the master calculation unit, and
   the abnormality detector outputs information indicating that an abnormality has occurred to the slave calculation unit through the interface when an abnormality is included in the detection result of the rotation angle sensor connected to the master calculation unit.

5. A steering device comprising:
   a motor including windings of a plurality of systems that apply power for steering a steered wheel of a vehicle; and
   the motor controller according to claim 1 in which the motor is set as a control subject.

6. A motor controller comprising a plurality of control systems configured to control actuation of a motor including windings of a plurality of systems, wherein:
   the control systems each include a drive circuit configured to supply current to a corresponding winding and a calculation unit combined with the drive circuit, and an independent external instruction value from an external device is input to the calculation unit of each of the control systems;
   the calculation units include a master calculation unit and a slave calculation unit;
   the master calculation unit is configured to use the external instruction value and calculate a current instruction value as a target of a current amount supplied to each of the windings and to output the current instruction value to the slave calculation unit;
   each of the master calculation unit and the slave calculation unit is configured to control actuation of the corresponding drive circuit based on the current instruction value; and
   when an abnormality is included in the external instruction value input to the master calculation unit from the external device, the slave calculation unit is configured to use the external instruction value input to the slave calculation unit from the external device instead of the external instruction value input to the master calculation unit to calculate the current instruction value.

7. The motor controller according to claim 6, wherein when an abnormality is included in the external instruction value input to the master calculation unit from the external device, the slave calculation unit calculates the current instruction value instead of the master calculation unit using the external instruction value input to the slave calculation unit from the external device and outputs the current instruction value to the master calculation unit.

8. The motor controller according to claim 7, further comprising an interface that connects the master calculation unit and the slave calculation unit to each other, wherein:
   the interface includes a first state that allows information to be output from the master calculation unit to the slave calculation unit and a second state that allows information to be output from the slave calculation unit to the master calculation unit; and
   the interface is set to the first state when an abnormality is not included in the external instruction value input from the external device to the master calculation unit, and the interface is set to the second state when an abnormality is included in the external instruction value input from the external device to the master calculation unit.

9. The motor controller according to claim 8, wherein the master calculation unit includes an abnormality detector that detects that an abnormality is included in the external instruction value input from the external device to the master calculation unit, and
   the abnormality detector outputs information indicating that an abnormality has occurred to the slave calculation unit through the interface when an abnormality is included in the external instruction value input from the external device to the master calculation unit.

10. A steering device comprising:
a motor including windings of a plurality of systems that apply power for steering a steered wheel of a vehicle; and
the motor controller according to claim 6 in which the motor is set as a control subject.

* * * * *